United States Patent
Xiao et al.

(10) Patent No.: US 12,407,651 B2
(45) Date of Patent: Sep. 2, 2025

(54) INLINE INSPECTION CYBERSECURITY ENFORCEMENT OF MULTIPART FILE TRANSMISSIONS

(71) Applicant: Palo Alto Networks, Inc., Santa Clara, CA (US)

(72) Inventors: Zihang Xiao, Los Gatos, CA (US); Lexuan Sun, Sunnyvale, CA (US); Mengying Jiang, Campbell, CA (US); Li Meng, Saratoga, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 147 days.

(21) Appl. No.: 18/170,084

(22) Filed: Feb. 16, 2023

(65) Prior Publication Data

US 2024/0283775 A1  Aug. 22, 2024

(51) Int. Cl.
H04L 9/40 (2022.01)

(52) U.S. Cl.
CPC ............... H04L 63/0245 (2013.01)

(58) Field of Classification Search
CPC ... H04L 67/06; H04L 63/0245; H04L 63/145; H04L 63/1408
See application file for complete search history.

(56) References Cited

U.S. PATENT DOCUMENTS

| | | | | |
|---|---|---|---|---|
| 5,960,170 A | * | 9/1999 | Chen ..................... | H04L 63/145 |
| | | | | 714/38.14 |
| 6,772,337 B1 | * | 8/2004 | Yener .................. | H04L 67/1001 |
| | | | | 380/279 |
| 8,132,073 B1 | * | 3/2012 | Bowers ............... | G06F 21/6227 |
| | | | | 713/160 |

(Continued)

OTHER PUBLICATIONS

Deng, "Computer Multimedia Network File Transfer Security Protection System", Transactions on Computer Science and Technology, vol. 7(1), 4 pages, 2019.

(Continued)

*Primary Examiner* — Aravind K Moorthy
(74) *Attorney, Agent, or Firm* — Gilliam IP PLLC

(57) ABSTRACT

Separating awareness of multipart file transmissions of different applications from traffic handling at a granularity of an individual application layer session facilitates efficient cybersecurity enforcement on multipart file transmissions. A protocol-based multipart file transmission regulator ("regulator") determines a per session message handling action to prevent completion of a multipart file transmission based on a protocol of an application identified for the session until cybersecurity analysis can be performed. The regulator then communicates the message handling action to a network component supporting the session. The regulator maintains information and file chunks in a data store for active sessions and determines with the data store whether a condition for requesting cybersecurity analysis for a multipart file transmission is satisfied. Upon obtaining a cybersecurity analysis verdict, the regulator provides the verdict or a verdict based instruction to the network component that ensures the multipart file transmission is compliant with a cybersecurity policy(ies).

22 Claims, 6 Drawing Sheets

(56) References Cited

U.S. PATENT DOCUMENTS

| | | | | |
|---|---|---|---|---|
| 8,533,166 B1* | 9/2013 | Sulieman | H04L 67/06 | 375/240 |
| 8,839,374 B1* | 9/2014 | Mehta | H04L 63/10 | 726/4 |
| 8,893,278 B1* | 11/2014 | Chechik | G06F 21/56 | 713/188 |
| 9,407,726 B1* | 8/2016 | He | H04L 67/06 | |
| 9,537,952 B1* | 1/2017 | Koorapati | G06F 16/182 | |
| 9,940,203 B1* | 4/2018 | Ghatnekar | G06F 11/1464 | |
| 9,984,088 B1* | 5/2018 | Desai | H04L 67/5681 | |
| 10,009,412 B1* | 6/2018 | Gao | H04L 67/568 | |
| 10,146,638 B1* | 12/2018 | Ati | G06F 11/1451 | |
| 10,432,686 B1* | 10/2019 | Wu | H04L 67/04 | |
| 10,503,904 B1* | 12/2019 | Singh | G06F 21/566 | |
| 10,523,755 B1* | 12/2019 | Quach | H04L 67/104 | |
| 10,616,336 B1* | 4/2020 | Zelenov | H04L 67/06 | |
| 10,795,588 B1* | 10/2020 | Yadav | G06F 11/1451 | |
| 10,880,322 B1* | 12/2020 | Jakobsson | H04L 51/08 | |
| 11,277,467 B1* | 3/2022 | Taneja | H04L 67/1097 | |
| 11,381,587 B2* | 7/2022 | Sun | H04L 63/1425 | 726/13 |
| 11,425,205 B1* | 8/2022 | Patel | H04L 67/141 | |
| 11,451,569 B1* | 9/2022 | Pendse | H04L 67/06 | |
| 11,663,336 B1* | 5/2023 | Armangau | G06F 21/60 | 726/23 |
| 11,755,733 B1* | 9/2023 | Armangau | G06F 21/568 | 726/23 |
| 11,841,970 B1* | 12/2023 | Fan | G06F 21/31 | |
| 12,143,389 B1* | 11/2024 | Edison | H04L 63/0281 | |
| 2003/0093643 A1* | 5/2003 | Britt, Jr. | G06F 8/658 | 711/170 |
| 2005/0154738 A1* | 7/2005 | Thomas | G06F 21/52 | |
| 2007/0124415 A1* | 5/2007 | Lev-Ran | H04L 51/063 | 709/217 |
| 2008/0154851 A1* | 6/2008 | Jean | G06F 16/1834 | |
| 2009/0043978 A1* | 2/2009 | Sawdon | G06F 16/174 | 711/E12.103 |
| 2009/0240678 A1* | 9/2009 | Sadovsky | G06F 16/40 | 707/999.005 |
| 2009/0248886 A1* | 10/2009 | Tan | H04L 67/10 | 709/231 |
| 2010/0011435 A1* | 1/2010 | Wee | H04L 67/06 | 709/206 |
| 2010/0077161 A1* | 3/2010 | Stoakes | G06F 11/1453 | 711/E12.103 |
| 2010/0212010 A1* | 8/2010 | Stringer | G06F 21/52 | 726/22 |
| 2010/0217889 A1* | 8/2010 | Simcoe | H04L 67/06 | 709/237 |
| 2010/0228737 A1* | 9/2010 | Riemers | G06F 16/9574 | 707/747 |
| 2010/0235472 A1* | 9/2010 | Sood | H04L 67/06 | 709/224 |
| 2010/0293142 A1* | 11/2010 | Ackerman | H04L 67/06 | 709/217 |
| 2011/0246491 A1* | 10/2011 | Clash | G06F 16/1827 | 707/755 |
| 2012/0150826 A1* | 6/2012 | Vijayan Retnamma | G06F 16/174 | 707/E17.007 |
| 2012/0167074 A1* | 6/2012 | Rajpure | H04L 67/06 | 709/217 |
| 2012/0233522 A1* | 9/2012 | Barton | G06F 11/1004 | 707/E17.014 |
| 2012/0303833 A1* | 11/2012 | Bao | H04N 21/2662 | 709/231 |
| 2012/0311403 A1* | 12/2012 | Gladwin | H04N 21/2393 | 714/763 |
| 2012/0331107 A1* | 12/2012 | Simcoe | H04L 67/06 | 709/219 |
| 2013/0031149 A1* | 1/2013 | Kern | H04L 67/1097 | 707/827 |
| 2013/0047057 A1* | 2/2013 | Resch | H04L 9/321 | 714/799 |
| 2013/0073522 A1* | 3/2013 | Chen | G06F 16/182 | 707/687 |
| 2013/0110904 A1* | 5/2013 | Okita | G06F 16/183 | 709/203 |
| 2013/0246377 A1* | 9/2013 | Gaitonde | H04L 63/0263 | 707/697 |
| 2014/0053227 A1* | 2/2014 | Ruppin | H04L 63/20 | 726/1 |
| 2014/0068006 A1* | 3/2014 | Singhal | H04N 21/8106 | 709/219 |
| 2014/0157405 A1* | 6/2014 | Joll | H04L 63/1425 | 726/22 |
| 2014/0188868 A1* | 7/2014 | Hunter | G06F 16/13 | 707/736 |
| 2014/0259094 A1* | 9/2014 | Narayanaswamy | H04L 63/20 | 726/1 |
| 2014/0328573 A1* | 11/2014 | Abhijeet | H04N 21/2181 | 386/263 |
| 2015/0039645 A1* | 2/2015 | Lewis | G06F 16/1748 | 707/769 |
| 2015/0128246 A1* | 5/2015 | Feghali | H04L 63/0209 | 726/13 |
| 2015/0163301 A1* | 6/2015 | Narayanan | H04L 67/1095 | 709/205 |
| 2015/0180931 A1* | 6/2015 | Marr | H04L 65/61 | 709/219 |
| 2015/0222685 A1* | 8/2015 | Anders | H04L 67/06 | 709/224 |
| 2015/0237060 A1* | 8/2015 | Wease | H04L 63/0254 | 726/13 |
| 2015/0332059 A1* | 11/2015 | Johnson | H04L 63/04 | 726/26 |
| 2016/0044100 A1* | 2/2016 | Tripathy | G06F 3/0613 | 709/219 |
| 2016/0072888 A1* | 3/2016 | Jung | H04L 67/01 | 709/219 |
| 2016/0119243 A1* | 4/2016 | Song | H04L 47/365 | 709/217 |
| 2016/0127260 A1* | 5/2016 | Gordon | H04N 21/234 | 709/231 |
| 2016/0248841 A1* | 8/2016 | Barajas Gonzalez | G06F 3/065 | |
| 2016/0277185 A1* | 9/2016 | Shulha | H04W 12/068 | |
| 2016/0277377 A1* | 9/2016 | March | G06F 16/13 | |
| 2016/0285912 A1* | 9/2016 | Carames | H04L 63/0227 | |
| 2016/0301751 A1* | 10/2016 | Peelen | H04L 67/06 | |
| 2016/0314052 A1* | 10/2016 | Gladwin | G06F 11/2058 | |
| 2016/0321288 A1* | 11/2016 | Malhotra | G06F 16/1774 | |
| 2017/0070302 A1* | 3/2017 | Tuscano | H04L 47/29 | |
| 2017/0091047 A1* | 3/2017 | Bangalore | G06F 16/2358 | |
| 2017/0091086 A1* | 3/2017 | Davis | G06F 16/182 | |
| 2017/0099258 A1* | 4/2017 | Joe | H04L 63/0236 | |
| 2017/0109370 A1* | 4/2017 | Newhouse | H04L 63/1491 | |
| 2017/0134428 A1* | 5/2017 | Vazquez Carames | H04L 63/20 | |
| 2017/0272543 A1* | 9/2017 | Lo | H04N 21/25 | |
| 2017/0337399 A1* | 11/2017 | Alonzo | H04W 12/02 | |
| 2018/0018458 A1* | 1/2018 | Schmugar | G06F 21/554 | |
| 2018/0089224 A1* | 3/2018 | Muthuswamy | G06F 16/13 | |
| 2018/0329834 A1* | 11/2018 | Grube | H04L 9/085 | |
| 2019/0007198 A1* | 1/2019 | Neumann | H04L 63/123 | |
| 2019/0109870 A1* | 4/2019 | Bedhapudi | H04L 63/0428 | |
| 2019/0179804 A1* | 6/2019 | Chittaro | G06F 16/1827 | |
| 2020/0134051 A1* | 4/2020 | Alkalay | G06F 3/0608 | |
| 2020/0145499 A1* | 5/2020 | Kaplan | G06F 16/9538 | |
| 2020/0293408 A1* | 9/2020 | Mutha | G06F 11/1451 | |
| 2020/0322287 A1* | 10/2020 | Connor | H04L 47/125 | |
| 2020/0364370 A1* | 11/2020 | Krafcik | G06Q 30/0615 | |
| 2021/0064238 A1* | 3/2021 | Selvarajan | G06F 3/0608 | |
| 2021/0211407 A1* | 7/2021 | Ochs-Willard | H04L 67/06 | |
| 2021/0227022 A1* | 7/2021 | Shrinivasan | H04L 9/0637 | |
| 2021/0234872 A1* | 7/2021 | Mitra | H04L 63/1416 | |
| 2021/0320941 A1* | 10/2021 | e Silva | H04L 63/1425 | |
| 2021/0400060 A1* | 12/2021 | Chacko | H04L 63/1416 | |
| 2021/0400106 A1* | 12/2021 | Karin | G06F 18/214 | |
| 2022/0012336 A1* | 1/2022 | Lakkundi | G06F 21/564 | |
| 2022/0070223 A1* | 3/2022 | Deng | H04L 63/20 | |

(56) References Cited

U.S. PATENT DOCUMENTS

| | | | | |
|---|---|---|---|---|
| 2022/0078236 | A1* | 3/2022 | Yonekura | G06F 16/182 |
| 2022/0083509 | A1* | 3/2022 | Dhanabalan | H04L 67/01 |
| 2022/0116406 | A1* | 4/2022 | Lewin | H04L 63/1408 |
| 2022/0201034 | A1* | 6/2022 | Kumar B | H04L 63/1408 |
| 2023/0199017 | A1* | 6/2023 | Chacko | H04L 63/20 |
| | | | | 726/22 |
| 2023/0259382 | A1* | 8/2023 | Van Os | G06F 11/3075 |
| | | | | 718/1 |
| 2023/0403318 | A1* | 12/2023 | Spitulski | H04L 67/06 |
| 2023/0412669 | A1* | 12/2023 | Heckman | H04L 67/06 |
| 2023/0412693 | A1* | 12/2023 | Lewin | H04L 63/1408 |
| 2023/0421562 | A1* | 12/2023 | Hakim | H04L 41/16 |

OTHER PUBLICATIONS

Gupta, "Survey on Security Issues in File Management in Cloud Computing Environment", arXiv:1505.00729, 5 pages, May 4, 2015.

PCT Application No. PCT/US2024/013115, International Search Report mailed Jun. 4, 2024, 4 pages.

PCT Application No. PCT/US2024/013115, Written Opinion mailed Jun. 4, 2024, 8 pages.

Chen, et al., "Filtering for Malice Through the Data Ocean: Large-Scale PHA Install Detection at the Communication Service Provider Level", 18th International Conference, Austin, TX, USA, Sep. 24-27, 2015; Lecture Notes in Computer Science, Springer, 25 pages.

* cited by examiner

INLINE INSPECTION CYBERSECURITY ENFORCEMENT OF MULTIPART FILE TRANSMISSIONS

BACKGROUND

The disclosure generally relates to transmission of digital information (e.g., CPC class H04L) and network architectures or network communication protocols for managing network security (e.g., subclass H04L63/20).

Multiple companies provide file management solutions that involve the upload and download of large files. These are also referred to as file storage services and cloud storage services. Different services may utilize software components that implement different protocols for multipart file transmission (i.e., transmitting different parts or "chunks" of files across multiple sessions). A client component on a sending endpoint will divide a file into chunks and transmit different chunks in different sessions (i.e., application layer sessions) established with a recipient endpoint.

A network cybersecurity component (e.g., a firewall, security access proxy, secure web proxy) processes network traffic to identify cybersecurity threats and identify violations of a cybersecurity policy. When processing network traffic corresponding to a multipart file transmission, the network cybersecurity component collects file chunks and metadata to reassemble the file for cybersecurity analysis.

BRIEF DESCRIPTION OF THE DRAWINGS

Embodiments of the disclosure may be better understood by referencing the accompanying drawings.

FIG. 1A depicts example components of the system and FIG. 1B depicts example operation of these components.

DESCRIPTION

Figure 1A:
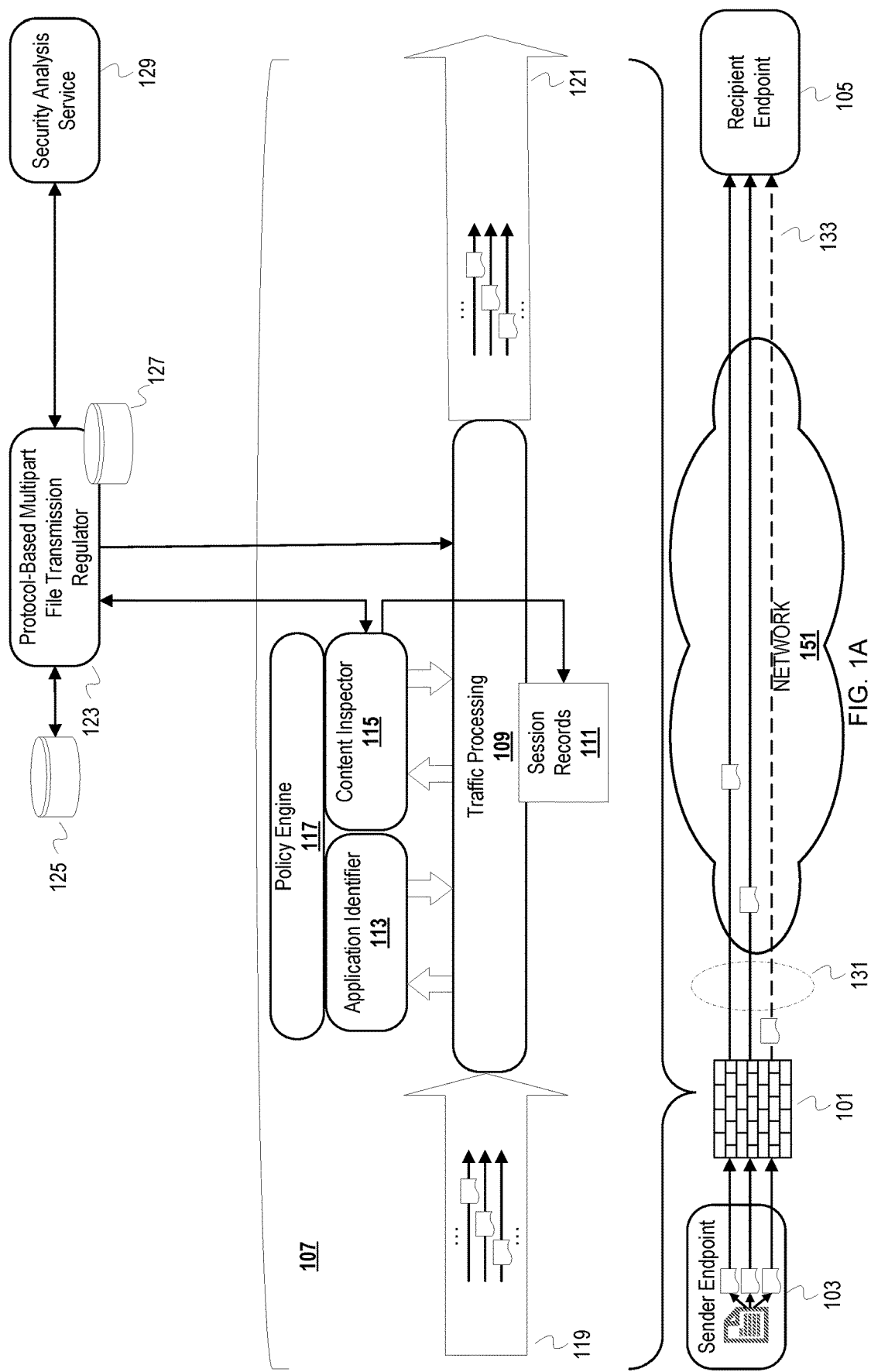
FIGS. 1A-1B are diagrams of an example system for efficiently enforcing cybersecurity compliance of multipart file transmissions.

The description that follows includes example systems, methods, techniques, and program flows to aid in understanding the disclosure and not to limit claim scope. Well-known instruction instances, protocols, structures, and techniques have not been shown in detail for conciseness.

Overview

A policy can be defined for one or more cybersecurity aspects, examples of which include data loss/leakage prevention (DLP), threat detection, and intrusion detection. For cybersecurity policy compliance, a file is analyzed to detect malware and/or detect sensitive information. Performing cybersecurity analysis for a multipart file transmission on a network component residing between the transmission endpoints (i.e., an intermediary network component) can introduce delay which impacts user experience. In addition, a network component that is handling network traffic and performing cybersecurity analysis at the application layer will have a higher compute resource requirement to perform both functions and to attempt to reduce the introduced delay. While a network component may already inspect and/or analyze packets or datagrams, some cybersecurity analysis analyzes a more comprehensive view of transmitted data (e.g., a message or document instead of a packet payload carrying a portion of the message or document). Moreover, the varying protocols implemented for multipart file transmission by applications increases the complexity of a network component for recognizing and handling traffic with different behaviors due to the different protocols.

Separating tracking states of multipart file transmissions of different applications from traffic handling at a granularity of an individual session facilitates cybersecurity enforcement on multipart file transmissions while preserving the efficiency of inline inspection. A protocol-based multipart file transmission regulator determines a per session message handling action to prevent completion of a multipart file transmission based on a protocol of an application identified for the session until cybersecurity analysis can be performed. The protocol-based multipart file transmission regulator then communicates the message handling action to a network component supporting the session. The protocol-based multipart file transmission regulator maintains information and file chunks in a data store for active sessions and determines with the data store whether a condition for requesting cybersecurity analysis for a multipart file transmission is satisfied. Upon obtaining a cybersecurity analysis verdict, the protocol-based multipart file transmission regulator provides the verdict or a verdict based instruction to the network component that ensures the multipart file transmission is compliant with a cybersecurity policy(ies). The program logic (hardware and/or software) that implements a "protocol-based multipart file transmission regulator" can be modularized by functionality. For example, determining a relevant protocol and message handling can be implemented as a first program while tracking states of multipart file transmissions and submission of a file/chunk for analysis can be implemented as a second program.

Example Illustrations

Figure 1B:
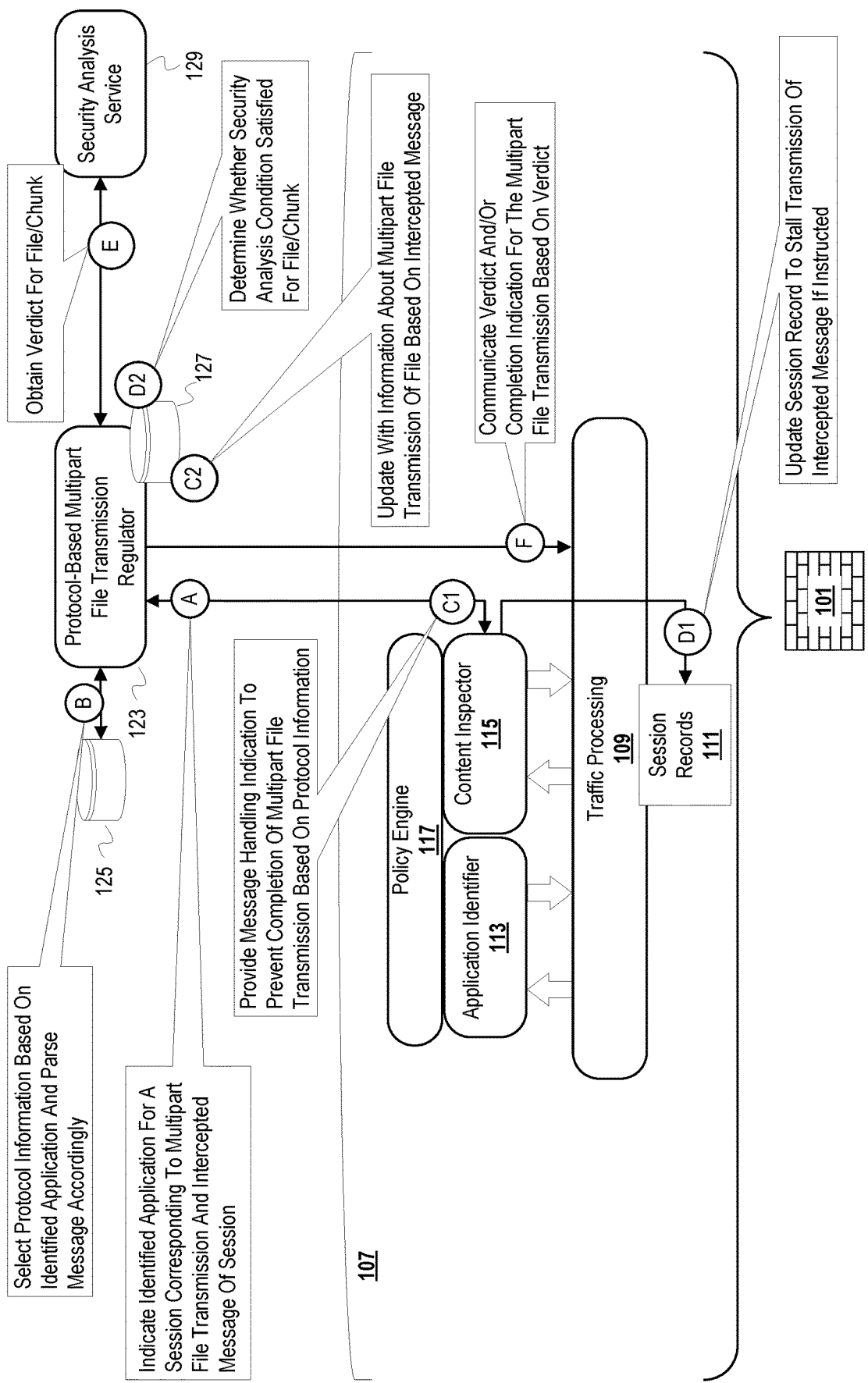

FIGS. 1A-1B are diagrams of an example system for efficiently enforcing cybersecurity compliance of multipart file transmissions. FIG. 1A depicts example components of the system and FIG. 1B depicts example operation of these components. FIG. 1A depicts a sender endpoint 103 transmitting a file to a receiver endpoint 105 via a firewall 101 and a network 151 (e.g., the Internet). FIG. 1A further depicts components 107 of the firewall 101 that interact with a protocol-based file transmission regulator 123 to enforce compliance of multipart file transmissions with a cybersecurity policy(ies). The protocol-based multipart file transmission regulator 123 uses a data store 125 of protocol information for various protocols of different applications relating to multipart file transmission and a data store 127 to track states of multipart file transmissions. The protocol-based multipart file transmission regulator 123 (hereinafter "regulator") submits files and/or file chunks to a security analysis service 129 to obtain a verdict.

The sender endpoint 103 and the recipient endpoint 105 are application layer components of an application that offers a cloud-based solution(s) for file storage and/or management (e.g., Software-as-a-Service (SaaS), Storage-as-a-Service (STaaS)). The illustrated endpoints 103, 105 represent client and server components (e.g., threads, processes, modules) of the application and not a device. The illustrated endpoints 103, 105 reside (logically) above other communications layers (e.g., transport layer, network layer) that are not depicted to avoid unnecessarily complicating the diagram. The endpoints 103, 105 implement a protocol of the application for a multipart file transmission 131 that includes multiple application layer sessions. The sender endpoint 103 breaks a file into file chunks ("chunks") and transmits the chunks in different sessions. FIG. 1A illustrates the multipart file transmission 131 including a session 133 in which a last chunk will be transmitted. FIG. 1A only illustrates data sessions (i.e., sessions transmitting chunks), but some multipart file transmissions include control sessions that signal start of a multipart file transmission and completion of a multipart file transmission. In addition, some protocols implemented for multipart file transmission will communicate metadata for reassembly of a file in the data sessions while others will communicate reassembly metadata in a control session(s) or in both a control session and data sessions.

The firewall 101 processes incoming traffic 119 at a network and/or transport layer (i.e., processes packets) and forward packets as outgoing traffic 121 according to configurations and policies installed on the firewall 101. In FIG. 1A, the multipart file transmission 131 is part of the traffic 119, 121, depending upon policy compliance. FIG. 1A depicts firewall components 107 as including traffic processing 109, application identifier 113, content inspector 115, and policy engine 117. Traffic processing 109 includes logic (i.e., software and/or hardware) for packet forwarding according to rules and policies enforced with information from the application identifier 113, content inspector 115, and the policy engine 117. The application identifier 113 attempts to identify an application with traffic in a lower layer session (i.e., a session of a layer below the application layer) and the content inspector 115 inspects traffic content (e.g., datagram payloads or packet payloads) for cybersecurity threats. The policy engine 117 identifies a relevant policy to apply to corresponding traffic based on identification of an application by the application identifier 117. The policy engine 117 also identifies cybersecurity policy(ies) to apply based on inspection results by the content inspector 115 and/or guides the content inspector 115 (e.g., identifying uniform resource locators (URLs) to filter). These components 113, 115, 117 provide information to traffic processing 109 for policy compliance.

Reference is made to these firewall components 107 and the protocol-based multipart file transmission regulator 123 to describe example operation of the system for cybersecurity policy compliance for multipart file transmissions. FIG. 1B is annotated with a series of letters A-F. Instead of a single stage C, stages C1-C2 are depicted due to the possible variations in timing relative to each other. Likewise, stages D1-D2 are illustrated instead of a single stage D. Each stage represents one or more operations. The stages illustrate one example to aid in understanding this disclosure and should not be used to limit the claims. Subject matter falling within the scope of the claims can vary from what is illustrated.

At stage A, the firewall 101 notifies the protocol-based multipart file transmission regulator 123 that an application corresponding to multipart file transmission has been identified based on analysis by the application identifier 113 and the content inspector 115. For example, the content inspector 115 performs HyperText Transfer Protocol (HTTP) decoding after application identification by the application identifier 113 to detect a HTTP message that relates to a multipart file transmission. This can involve the content inspector 115 extracting payloads from a lower layer session to form the message and then decoding the message according to the relevant protocol. The firewall 101 communicates the detected message ("intercepted message") and application identifier to the protocol-based multipart file transmission regulator 123.

At stage B, the protocol-based multipart file transmission regulator 123 selects application layer protocol information from the data store 125 based on the application identifier communicated from the firewall 101 to process the intercepted message. With the protocol information, the protocol-based multipart file transmission regulator 123 can parse the message and extract metadata that identifies the multipart file transmission (e.g., a download or upload identifier), and that identifies the application layer session in which the message was intercepted. Further, the protocol-based multipart file transmission regulator 123 can determine whether the intercepted message carries a chunk and extract the chunk. The metadata of the message may also provide information for file reassembly (e.g., metadata describing the chunk as chunk 2 of 3). A firewall will likely observe traffic of different applications having different protocols for multipart file transmissions. The protocol-based multipart file transmission regulator 123 uses the data store 125 (e.g., a configuration file) with information for these different application protocols. If the protocol-based multipart file transmission regulator 123 is distinct from the firewall 101, this protocol knowledge can be maintained without increasing the resource demands of the firewall 101.

Stages C1-C2 are stages of operations performed based on selecting the protocol information corresponding to the intercepted message. Implementations can initiate these in any order and can perform them concurrently. At stage C1, the protocol-based multipart file transmission regulator 123 provides a messaging handling indication to prevent completion of the multipart file transmission corresponding to the intercepted message. The message handling indication is based on the protocol information selected based on the intercepted message and application identifier communicated in stage A. The message handling indication will indicate that the intercepted message can be allowed or should be stalled. The indication depends upon the protocol and configuration. If completion of the multipart file transmission can be prevented by stalling transmission of a last file chunk or a complete control message and the intercepted message is that control message or carries that last file chunk, then message handling indication will indicate (e.g., with a flag or command) to stall the intercepted message. If the intercepted message does not carry the last file chunk or is not a complete control message, then the message handling file indication will indicate that the intercepted message (i.e., the packets or datagrams carrying payloads that form the intercepted message) can be transmitted to the recipient endpoint or at least transmitted from the firewall 101.

At stage D1, the firewall 101 updates session records 111 to stall transmission of the intercepted message if indicated in the message handling indication from the protocol-based multipart file transmission regulator 123. Stage D1 occurs subsequent to stage C1 since it is dependent upon the message handling indication, but can occur concurrently or asynchronously with respect to stages C2 and D2. For the depicted implementation of a firewall, updating the session records 111 involves the traffic processing component 109 accessing a network and/or transport layer session ("layer 3/4 session") record indicated by the content inspector 115 and setting a field to prevent the firewall 101 from forwarding network traffic of the session corresponding to the selected record. The content inspector 115 (in this example architecture) determines the lower layer session corresponding to the application layer session of the intercepted message. In some cases, an application layer session relies on multiple lower layer sessions. In these cases, the content inspector 115 will map the application layer session to the n lower layer sessions and indicate to the traffic processing component 111 the n layer 3/4 session records to update to stall transmission of the intercepted message. If the message handling indication indicates that the intercepted message should be allowed to pass the firewall, the relevant record(s) in the session records 111 is updated accordingly.

At stage C2, the protocol-based multipart file transmission regulator 123 updates the data store 127 with information about the multipart file transmission of a file based on the intercepted message. The protocol-based multipart file transmission regulator 123 maintains the data store 127 to track progress or state of multipart file transmissions. The protocol-based multipart file transmission regulator 123 has visibility of multipart file transmissions traversing the firewall 101 and possibly other network components. When the protocol-based multipart file transmission regulator 123 receives an intercepted message, the visibility is from the intercepted message (i.e., a partial view of the multipart file transmission). Maintaining the data store 127 with information (e.g., chunks, chunk metadata, session metadata) of an intercepted message and/or about a corresponding application layer session allows for correlation of the chunk and/or metadata of the intercepted message with other entries in the data store 127 to obtain a comprehensive view of a multipart file transmission. If a chunk was extracted from the intercepted message, then the protocol-based multipart file transmission regulator 123 inserts the chunk into the data store 127 indexed or retrievable by an identifier that identifies the multipart file transmission to facilitate correlation of chunks from different sessions. The multipart file transmission identifier depends on the corresponding protocol. For example, the protocol-based multipart file transmission regulator 123 may extract a multipart file transmission identifier from the intercepted message and correlate other messages with the identifier. or construct the identifier from a combination of a file identifier and an application layer session identifier. As another example, a file identifier in combination with endpoint identifiers may be used to identify a multipart file transmission.

At stage D2, the protocol-based multipart file transmission regulator 123 determines whether a security analysis condition is satisfied for a multipart file transmission based on information in the data store 127. Stage D2 is performed after the update of stage C2, but is asynchronous with respect to stage D1. After updating the data store 127, the protocol-based multipart file transmission regulator 123 queries the data store 127 with the multipart file transmission identifier determined from the intercepted message. With the information in the data store 127, the protocol-based multipart file transmission regulator 123 can correlate chunks and/or metadata from different application layer sessions. For instance, the query returns the recent update and any other entries having in common the multipart file transmission identifier. The condition for security analysis depends upon the selected protocol information and configuration of the protocol-based multipart file transmission regulator 123 and/or policy configuration of a customer corresponding to the firewall 101. Configuration indicates a granularity for obtaining security analysis verdicts (e.g., verdicts of files, chunks, or both), and this may vary by firewall, customer, and/or protocol. If configured for chunk or both file and chunk granularity analysis, then the condition for security analysis is the availability of a chunk. For file granularity analysis, the condition is capability to reassemble a file (i.e., availability of chunks to reassemble a file).

At stage E, the protocol-based multipart file transmission regulator 123 obtains a security analysis verdict for a file and/or chunk depending upon the result of stage D2. Assuming the security analysis service 129 is distinct from the protocol-based multipart file transmission regulator 123, the protocol-based multipart file transmission regulator 123 submits the chunk and/or file to the security analysis service 129. The security analysis service 129 analyzes the chunk and/or file for malware and/or violation of a DLP policy.

At stage F, the protocol-based multipart file transmission regulator 123 communicates the obtained verdict and/or a completion indication for the multipart file transmission based on the verdict. The protocol-based multipart file transmission regulator 123 can be configured to provide the verdict alone and allow further action to be decided upon independent of the protocol-based multipart file transmission regulator 123. In this case, a stalled message(s) will remain stalled unless other action is taken, for example by a user. The firewall 101 can be configured to release stalled traffic based on receipt of a benign verdict. If configured to provide a completion indication, the protocol-based multipart file transmission regulator 123 communicates an indication to the firewall 101 that completion of the multipart file transmission should be prevented if the verdict is negative (i.e., verdict of malicious or cybersecurity policy non-compliance). For a benign verdict, the protocol-based multipart file transmission regulator 123 is configured to communicate an indication to the firewall 101 to allow completion of the multipart file transmission. An implementation that communicates a verdict alone allows the protocol-based multipart file transmission regulator 123 to be agnostic with respect to how the firewall 101 allows or prevents completion of the multipart file transmission. An implementation that communicates a completion indication allows for flexibility in extent of delegation or division of labor with respect to how completion or prevention is handled.

Figure 2:
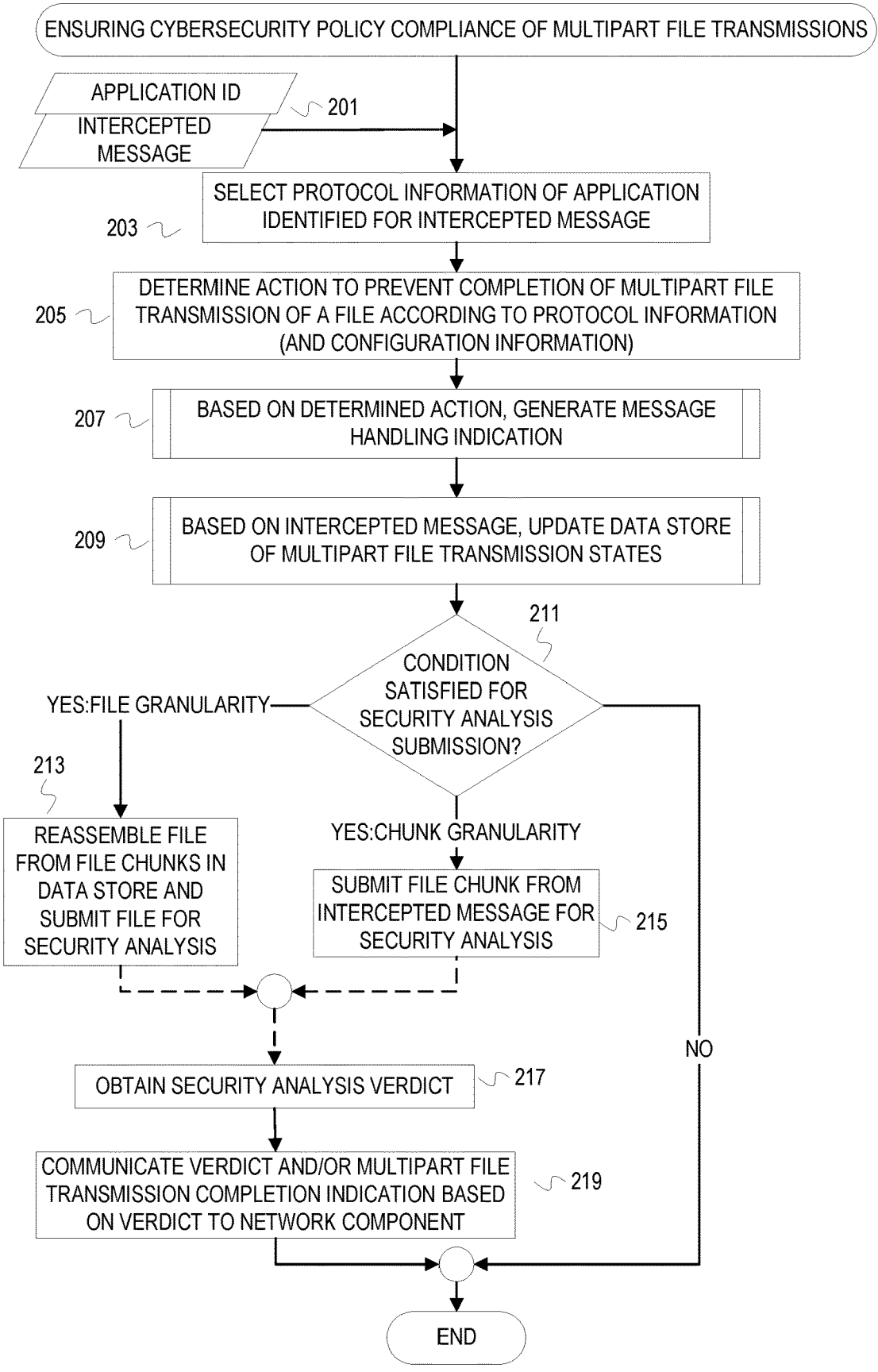
FIG. 2 is a flowchart of example operations for ensuring cybersecurity policy compliance of multipart file transmissions.
Figure 3:
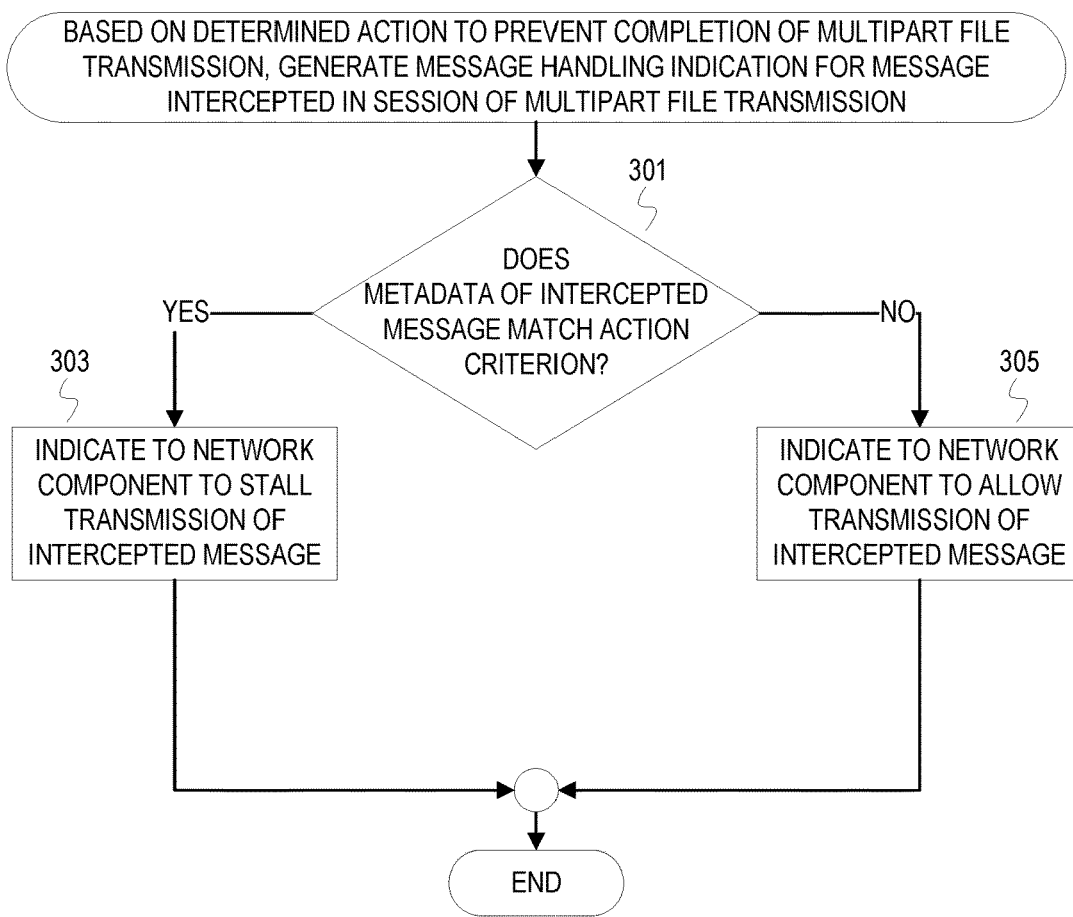
FIG. 3 is a flowchart of example operations for generating a message handling indication for a message intercepted in an application layer session of a multipart file transmission based on determining an action to prevent completion of the multipart file transmission.

FIGS. 1A-1B present a limited view of the numerous possible architectural and deployment implementations possible for the disclosed technology for efficiently securing multipart file transmissions. FIGS. 2-3 are flowcharts of operations that are more general than the example illustrated in FIGS. 1A-1B. While the flowcharts are based on separation of multipart file transmission regulation from the traffic handling and security analysis, deployment of corresponding program code can vary (e.g., different devices, virtual machines, etc.).

FIG. 2 is a flowchart of example operations for ensuring cybersecurity policy compliance of multipart file transmissions. For consistency with FIGS. 1A-1B, the operations are described with reference to a multipart file transmission regulator as performing the operations.

At block 203, a multipart file transmission regulator selects protocol information of an application identified for an application layer session corresponding to an intercepted message 201. A network component (e.g., a physical or logical network component) with traffic handling hardware and/or software logic intercepted a message in a session identified as an application layer session of an application that transmits a file in chunks over multiple application layer sessions. The network component intercepts the message (i.e., inspects or manipulates the message prior to the recipient endpoint receiving it) to obtain a message handling indication since the message relates to a multipart file transmission. In addition to the intercepted message 201, the network component indicates an application identifier since application identification is performed at the network component. The multipart file transmission regulator uses the application identifier to select the protocol information.

At block 205, the multipart file transmission regulator determines an action to prevent completion of the multipart file transmission of a file according to the selected protocol information. The protocol information indicates how file chunks are transmitted, how the corresponding metadata for reassembly is communicated, whether acknowledgements are required, and how a multipart file transmission begins and completes. The protocol information may also indicate other session management information, such as retries and timeouts. With this information, the multipart file transmission regulator determines an action that will prevent the completion of the multipart file transmission. For instance, the protocol information may indicate that an action to prevent completion is to stall a control message indicating completion of the multipart file transmission and/or acknowledging receipt of a last file chunk. The prevent action is not necessarily based solely on the protocol information. The multipart file transmission regulator may also refer to configuration information of a customer or default policy to determine the prevent action. Using the same example, the prevent action based on the protocol information may be to stall the identified control message, but configuration information may specify that at least one file chunk must also be stalled until a security analysis verdict has been obtained. Similarly, protocol information may indicate a prevent action to stall a last chunk but configuration information may specify a percentage of chunks to be stalled. Thus, the protocol information indicate a minimal action to prevent completion of a multipart file transmission while configuration information can expand the prevent action(s).

At block 207, the multipart file transmission regulator generates a message handling indication based on the determined action. If the intercepted message matches the prevent action criterion, then the multipart file transmission regulator will generate an indication to stall the intercepted message. A more detailed example for block 207 is provided in FIG. 3.

At block 209, the multipart file transmission regulator updates a data store of multipart file transmission states based on the intercepted message. An intercepted message may indicate another file chunk of a file transmission, reassembly metadata, a completion acknowledgement, etc. A more detailed example for block 209 is provided in FIG. 4.

At block 211, the multipart file transmission regulator determines whether a condition is satisfied for security analysis submission. A condition for security analysis submission can be defined in configuration by customer, tenant, etc. For file granularity analysis, a condition is that the multipart file transmission regulator has sufficient metadata and chunks to reassemble the file for analysis. For file chunk granularity analysis, the condition may be the availability of the chunk but may also relate to any verdict of other chunks. For example, a condition may specify that analysis of a chunk can be skipped if another chunk of the same file already has a negative verdict. In some cases, a multipart file transmission may be subject to both granularities of analysis. For instance, malware scanning may be on both a chunk and file granularity. If the condition for file granularity analysis is satisfied, then operational flow proceeds to block 213. If the condition for chunk granularity analysis is satisfied, then operational flow proceeds to block 215. If no condition is satisfied, then operational flow ends.

At block 213, the multipart file transmission regulator reassembles the file from the file chunks in the data store and submits the file for security analysis. Along with the chunks, the data store will also host metadata guiding reassembly of the file.

At block 215, the multipart file transmission regulator submits the file chunk extracted from the intercepted message for security analysis. Submission of a file or a chunk for security analysis may be via service request (e.g., HTTP request), application programming interface (API) invocation, etc.

At block 217, the multipart file transmission regulator obtains a security analysis verdict in response to the submission (block 213 and/or block 215). The dashed lines from blocks 213, 215 to 217 represent the asynchronous relationship. The verdict may indicate that malware was detected or that sensitive information was detected in a file or chunk thus violating a DLP policy.

At block 219, the multipart file transmission regulator communicates the verdict and/or a multipart file transmission completion indication based on the verdict to the network component that intercepted the message 201. Embodiments may simply communicate the verdict to the network component that intercepted the message and rely on the security policy defined at the network component to drive the subsequent action based on the verdict (e.g., notification, quarantine, allowing transmission, etc.). For a negative/malicious verdict, the multipart file transmission will not complete since it has been stalled while awaiting security analysis. Embodiments can also communicate an indication regarding completion of the multipart file transmission based on the verdict. The completion indication may be to allow the stalled transmission to remain stalled or to terminate the corresponding application layer session, assuming a negative verdict. For a positive/benign verdict, the completion indication is to allow an intercepted message to proceed. If multiple messages of a multipart file transmission have been stalled, the completion indication may identify the sessions and/or messages to no longer stall based on information in the data store that tracks states of multipart file transmissions.

FIG. 3 is a flowchart of example operations for generating a message handling indication for a message intercepted in an application layer session of a multipart file transmission based on determining an action to prevent completion of the multipart file transmission. The example operations relate to block 207 of FIG. 2. Prior to these example operations, an action has been determined to prevent completion of a multipart file transmission. As described earlier, the action is determined with protocol information selected based on the application identified for the intercepted message.

At block 301, the multipart file transmission regulator determines whether metadata of the intercepted message matches an action criterion. The action criterion will indicate an attribute (or criteria will indicate attributes) for message matching. Assuming a control message is to be stalled to prevent completion of the corresponding multipart file transmission, the criterion may specify a message type of control and possibly an additional attribute that the control message indicates completion or an acknowledgement. An action criterion may specify that a data message (i.e., a message carrying a data chunk) be stalled and allow for configuration to specify which chunk(s) to stall or default to stalling a last chunk, if the last chunk can be identified from metadata extracted from the message. To determine whether the intercepted message matches the action criterion or satisfies the action criterion, the multipart file transmission regulator evaluates the metadata associated with the intercepted message in the data store against the criterion. If the intercepted message matches the criterion, then operational flow process to block 303. Otherwise, operational flow proceeds to block 305.

At block 303, the multipart file transmission regulator indicates to a network component that intercepted the message to stall the transmission of the intercepted message. The indication can be an application layer message, function invocation via an API, etc. Accordingly, the network component will update its information (e.g., a forwarding table) to stall the intercepted message. For instance, the packets/datagrams corresponding to the application layer message will be held in queues of the network component until a field is set that allows the packets to be transmitted.

At block 305, the multipart file transmission regulator indicates to the network component to allow transmission of the intercepted message. Allowing transmission of the intercepted message avoids or at least reduces impact on user experience while ensuring cybersecurity compliance enforcement of a multipart file transmission.

Figure 4:
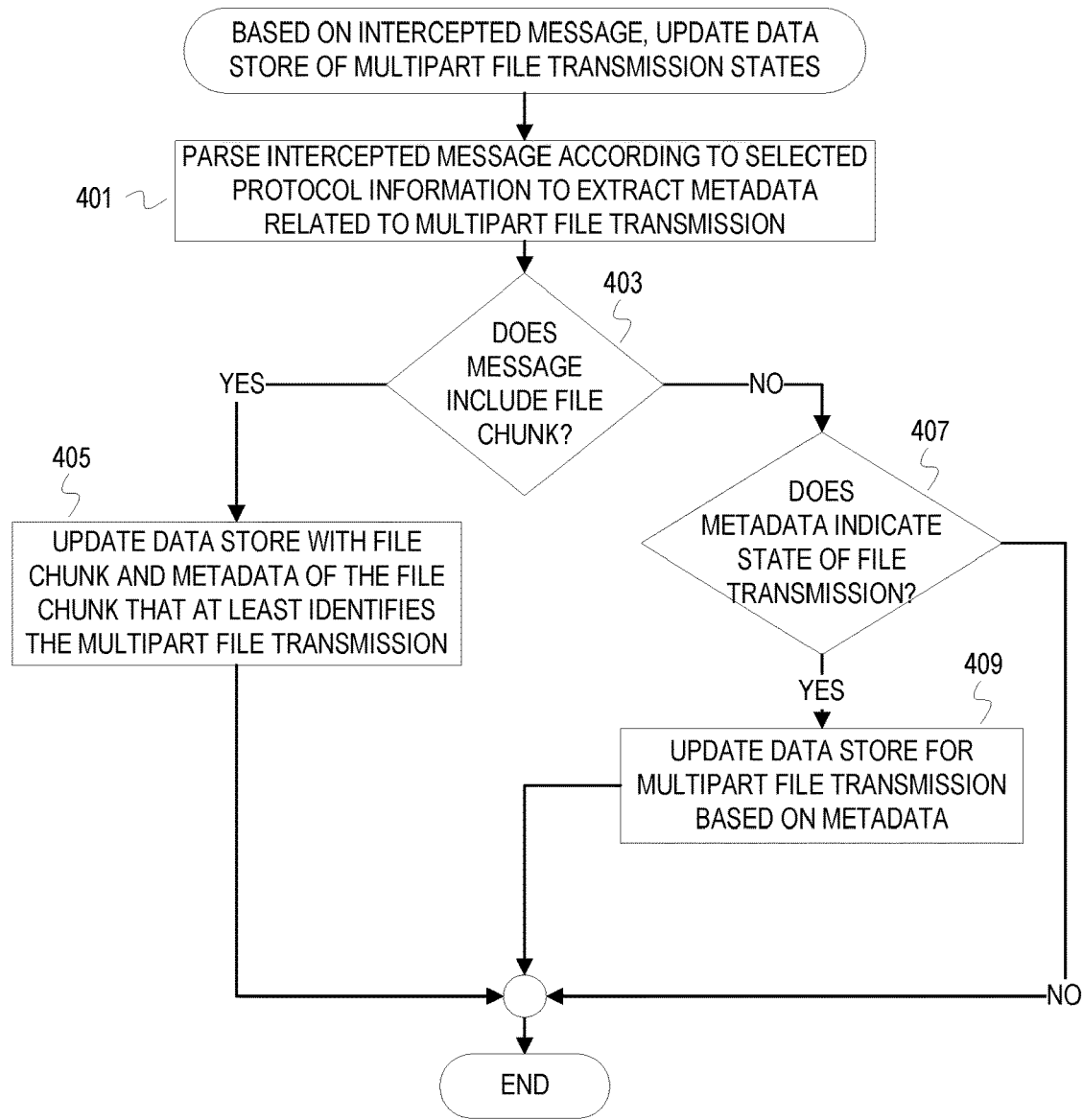
FIG. 4 is a flowchart of example operations for updating a data store of multipart file transmission states based on an intercepted message.

FIG. 4 is a flowchart of example operations for updating a data store of multipart file transmission states based on an intercepted message. The example operations of FIG. 4 relate to block 209 of FIG. 2. Since state of a multipart file transmission is based on metadata extracted from message of different application layer sessions, the multipart file transmission regulator updates the data store and then queries/accesses the data store to determine state. Thus, each incremental update allows a more comprehensive view of a multipart file transmission.

At block 401, the multipart file transmission regulator parses an intercepted message according to selected protocol information to extract metadata related to a multipart file transmission. With the selected protocol information, the multipart file transmission regulator can identify a field(s) of the message in the header and/or body that relates to the multipart file transmission. The message may include a field that specifies start of a chunk. The metadata in the field(s) may indicate message type (e.g., acknowledgement or data type) and/or chunk information (e.g., block identifier). The extracted metadata also identifies the multipart file transmission. This can be explicit. A protocol may require a field in messages to identify the multipart file transmission (e.g., download identifier or upload identifier). Identification of a multipart file transmission may be a combination of metadata. For example, a multipart file transmission may be identified by a file identifier and endpoint identifiers.

At block 403, the multipart file transmission regulator determines whether the message includes a file chunk. If the message identifies the message as a control type or data type message, the multipart file transmission regulator can use this metadata to determine whether the message carries a file chunk. If the message includes a file chunk, then operational flow proceeds to block 405. If it does not, then operational flow proceeds to block 407.

At block 407, the multipart file transmission regulator determines whether the metadata of the message indicates state of file transmission. Since the message does not carry a file chunk, the message is likely a control message. Depending upon the protocol, the message may indicate start or completion of a multipart file transmission. The message may be an acknowledgement of a chunk from the recipient to the sender. If the metadata indicates state of the multipart file transmission, then operational flow proceeds to block 409.

At block 409, the multipart file transmission regulator updates the data store for the multipart file transmission based on the extracted metadata. The multipart file transmission regulator determines whether an entry already exists for the multipart file transmission by querying the data store with the identifier of the multipart file transmission. If an entry exists, then the entry is updated with the metadata. If not, a new entry is created with the extracted metadata in association with the identifier of the multipart file transmission.

If the message was determined to be carrying a file chunk at block 403, then the multipart file transmission regulator updates the data store with the file chunk and with metadata of the file chunk that at least identifies the multipart file transmission. Similar to block 409, the multipart file transmission regulator uses the identifier or collection of metadata that identifies the multipart file transmission to query the data store and then updates a returned entry or inserts a new entry that includes or refers to the chunk along with extracted metadata. The metadata extracted from the intercepted message may identify the chunk with respect to the other chunks (e.g., chunk 3 of 5 or bytes 100-300). To further avoid or reduce delay, the data store can be an in-memory structure (e.g., the Redis data structure store).

The set of example operations of FIG. 4 end after any of blocks 405, 407, 409. If the metadata does not indicate state of the multipart file transmission, then operational flow proceeds to a next set of one or more operations for determining whether or not to submit the file or chunk for analysis (e.g., block 211 of FIG. 2). Otherwise, after updating the data store (405, 409), operations proceed to using the information in the data store to determine whether to submit a file and/or chunk for analysis.

Variations

In some cases, a protocol may include a retry mechanism that is triggered while a message is stalled according to the technology disclosed herein. As an example, an application layer retry mechanism for multipart file transmission may retransmit a stalled chunk in smaller chunks in other application layer sessions. Protocol information maintained for regulating multipart file transmission for cybersecurity policy enforcement will indicate that a retry mechanism exists and the application sender will attempt to retransmit a chunk in smaller chunks if acknowledgement of a chunk (e.g., last chunk) is not received within a timeout period. Embodiments can be configured to allow a subset of the smaller chunks, stall all of the smaller chunks, or discard all of the smaller chunks. The smaller chunks could be discarded assuming the chunk from which the smaller chunks were generated will be transmitted upon receipt of a benign verdict, for example. Implementations can perform "housekeeping" differently when smaller chunks are detected in retransmission sessions. For instance, the subset of smaller chunks can be held instead of the larger chunk or both the small chunks and corresponding large chunk can be maintained in traffic queues and released with receipt of a benign verdict depending upon how the protocol handles the scenario.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. Although depicted as occurring after block 207, block 209 may be performed prior to block 205 or concurrently with blocks 205 or 207. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
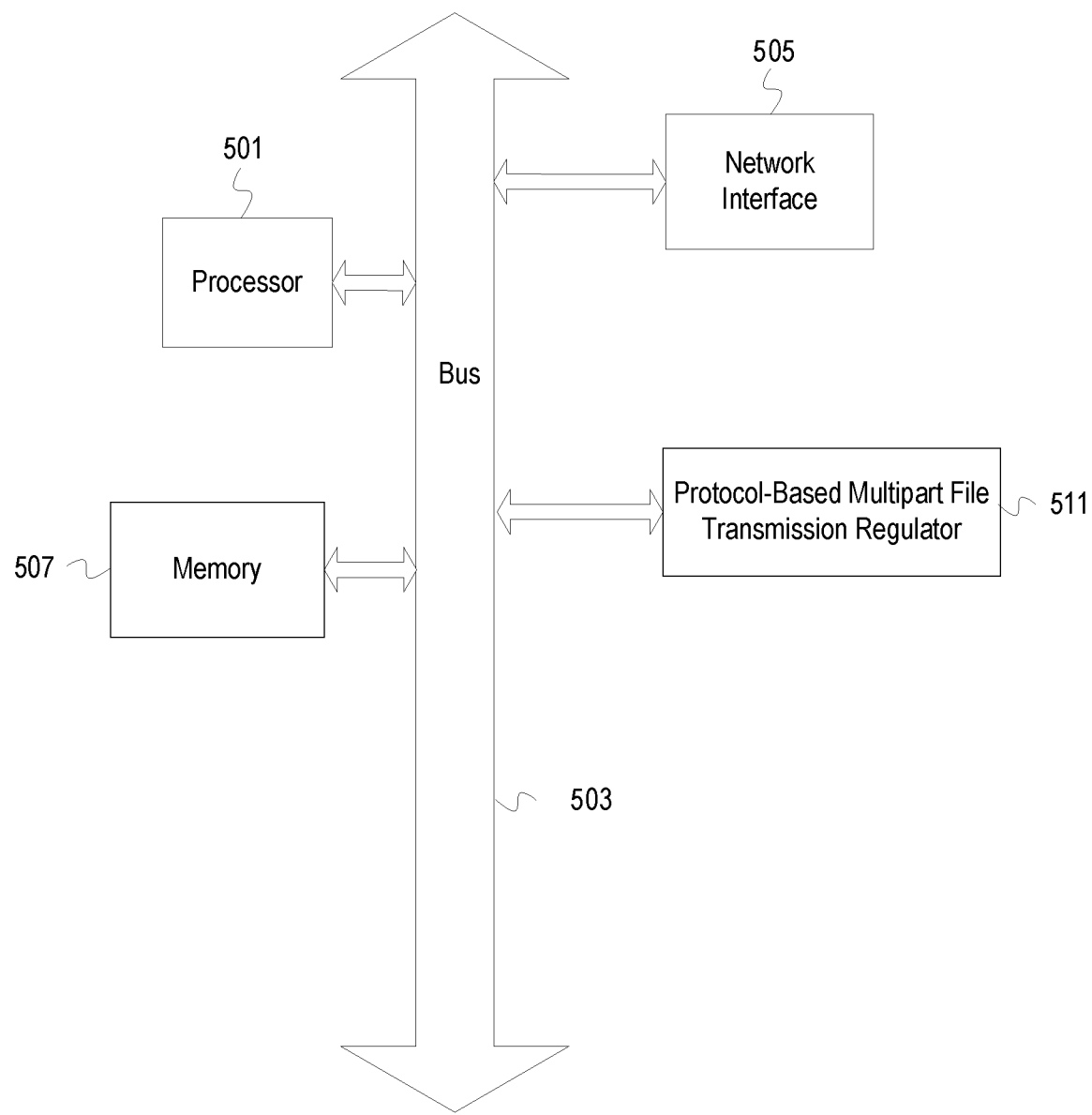
FIG. 5 depicts an example computer system with a protocol-based multipart file transmission regulator.

FIG. 5 depicts an example computer system with a protocol-based multipart file transmission regulator. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a protocol-based multipart file transmission regulator 511. The protocol-based multipart file transmission regulator 511 regulates transmission of messages in application layer sessions of a multipart file transmission to allow for analysis of file chunks with minimal impact on user experience and without increasing resource demand on an intermediary network component handling and examining traffic between endpoints. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor 501.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:
1. A method comprising:
   based on an identification of an application for a first session of multiple sessions for a multipart file transmission of a file, determining a prevent action to prevent completion of the multipart file transmission;

instructing an intermediary network component to allow transmission or stall transmission of a first message in the first session based, at least in part, on the prevent action;

obtaining from the first message a first chunk of a plurality of chunks that constitutes the file and first metadata of the first chunk;

updating a data store to indicate the first chunk and the first metadata;

determining whether a cybersecurity analysis condition is satisfied based on information in the data store corresponding to the file;

based on a determination that the cybersecurity analysis condition is satisfied, supplying the first chunk or the file for cybersecurity analysis; and communicating to the intermediary network component at least one of a verdict of the cybersecurity analysis and an indication to allow or prevent completion of the multipart file transmission.

2. The method of claim 1 further comprising:
parsing, based on a protocol of the identified application, at least one of a header and a payload of the first message to obtain the first chunk and the first metadata.

3. The method of claim 1, wherein determining the prevent action comprises determining whether stalling transmission of a control message or a file chunk will prevent completion of the multipart file transmission based on a protocol of the identified application.

4. The method of claim 1, wherein determining the prevent action is also based on configuration information.

5. The method of claim 1, wherein the prevent action comprises stalling transmission of a subset of chunks that constitute a file to a recipient endpoint, stalling transmission of a control message that indicates completion of a multipart file transmission, stalling transmission of an acknowledgement message, and stalling transmission to a recipient endpoint of a control message for reassembling chunks into a file.

6. The method of claim 1, wherein communicating an indication to allow completion of the multipart file transmission is based on the verdict indicating that the file is benign or that transmission of the file does not violate a policy.

7. The method of claim 1, wherein communicating an indication to prevent completion of the multipart file transmission is based on the verdict indicating that the file or the first chunk is malicious or that transmission of the file or the first chunk violates a policy.

8. The method of claim 1 further comprising:
obtaining the other chunks of the plurality of chunks and corresponding metadata from other messages in the other ones of the multiple sessions; and updating the data store to indicate the other chunks and corresponding metadata, wherein determining whether the cybersecurity analysis condition is satisfied based on information in the data store corresponding to the file comprises determining whether the file can be reassembled based on chunks and metadata in the data store.

9. The method of claim 1, wherein the verdict is for one of the first chunk and the file.

10. A non-transitory machine-readable medium having stored thereon program code, the program code comprising instructions to:

track states of files of multipart file transmissions to facilitate cybersecurity compliance, wherein the instructions to track states of the files comprise instructions to, based on receipt of a communication indicating an intercepted message of a session and an application identified for the session, update a data store based on the intercepted message;

based on the identified application, determine an action to prevent completion of a multipart file transmission corresponding to the session; and indicate to a network component to stall or allow transmission of the intercepted message based on the determined action;

based on receipt of the communication indicating the intercepted message, determine whether a cybersecurity analysis condition is satisfied based on information in the data store corresponding to the multipart file transmission;

if the cybersecurity analysis condition is satisfied, obtain a cybersecurity analysis verdict for a file of the multipart file transmission or a file chunk extracted from the intercepted message; and communicate to a network component that intercepted the intercepted message at least one of a verdict of the cybersecurity analysis and an indication to allow or prevent completion of the multipart file transmission.

11. The non-transitory machine-readable medium of claim 10, wherein the instructions to communicate the indication to allow completion of the multipart file transmission comprise instructions to determine that the cybersecurity analysis verdict indicates the file as benign or transmission of the file as not violating a cybersecurity policy.

12. The non-transitory machine-readable medium of claim 10, wherein the instructions to communicate the indication to prevent completion of the multipart file transmission comprise instructions to determine that the cybersecurity analysis verdict indicates the file or a file chunk as malicious or transmission of the file or a file chunk as violating a policy.

13. The non-transitory machine-readable medium of claim 10, wherein the instructions to update the data store based on the intercepted message comprise instructions to extract a file chunk from the intercepted message based on a protocol of the identified application and store the file chunk in the data store in association with information identifying the session, the multipart file transmission corresponding to the session, and the identified application.

14. The non-transitory machine-readable medium of claim 10, wherein the instructions to update the data store based on the intercepted message comprise instructions to determine the intercepted message is a control message based on a protocol of the identified application, and update the data store to indicate the control message, information identifying the session, information identifying the multipart file transmission corresponding to the session, and a type of the control message.

15. The non-transitory machine-readable medium of claim 10, wherein the instructions to determine the action to prevent completion of the multipart file transmission corresponding to the session based on the identified application comprise instructions to select the action from a plurality of actions based on the identified application, wherein the plurality of actions corresponds to a plurality of protocols of different applications.

16. The non-transitory machine-readable medium of claim 10, wherein the instructions to determine whether the cybersecurity analysis condition is satisfied comprise instructions to determine whether the file can be reassembled based on information and file chunks in the data store.

17. The non-transitory machine-readable medium of claim 16, wherein the program code further comprises instructions to reassemble the file with the file chunks and information in the data store based on a determination that the cybersecurity analysis condition is satisfied.

18. The non-transitory machine-readable medium of claim 10, wherein the instructions to determine whether a cybersecurity analysis condition is satisfied comprise instructions to determine whether a cybersecurity analysis verdict has been obtained for at least one of the multiple file chunks that constitute the file.

19. An apparatus comprising:
a processor;
a set of one or more network interfaces; and
a set of one or more machine-readable medium having program code stored thereon, the program code executable by the processor to cause the apparatus to,
track states of files of multipart file transmissions to facilitate cybersecurity compliance, wherein the instructions to track states of the files comprise instructions to,
based on receipt of a communication via one of the set of network interfaces indicating an intercepted message of a session and an application identified for the session, update a data store based on the intercepted message;
based on the identified application, determine an action to prevent completion of a multipart file transmission corresponding to the session; and
indicate to a network component to stall or allow transmission of the intercepted message based on the determined action;
based on receipt of the communication indicating the intercepted message, determine whether a cybersecurity analysis condition is satisfied based on information in the data store corresponding to the multipart file transmission;
if the cybersecurity analysis condition is satisfied, obtain a cybersecurity analysis verdict for a file of the multipart file transmission or a file chunk extracted from the intercepted message; and
communicate to a network component that intercepted the intercepted message at least one of a verdict of the cybersecurity analysis and an indication to allow or prevent completion of the multipart file transmission.

20. The apparatus of claim 19, wherein the program code to communicate to a network component that intercepted the intercepted message an indication to allow or prevent completion of the multipart file transmission comprises the program code being executable by the processor to cause the apparatus to,
based on the cybersecurity analysis verdict indicating the file as benign or transmission of the file as not violating a cybersecurity policy, indicate to the network component to allow transmission of the intercepted message to a recipient endpoint, or
based on the cybersecurity analysis verdict indicating the file or a file chunk as malicious or transmission of the file or a file chunk as violating a cybersecurity policy, indicate to the network component to stall or prevent transmission of the intercepted message to a recipient endpoint.

21. The apparatus of claim 19, wherein the program code to determine the action to prevent completion of the multipart file transmission corresponding to the session based on the identified application comprises the program code being executable by the processor to cause the apparatus to select the action from a plurality of actions based on the identified application, wherein the plurality of actions corresponds to a plurality of protocols of different applications.

22. The apparatus of claim 19, wherein the program code to determine whether the cybersecurity analysis condition is satisfied comprises the program code being executable by the processor to cause the apparatus to determine whether the file can be reassembled based on information and file chunks in the data store or to determine whether a cybersecurity analysis verdict has been obtained for at least one of the multiple file chunks that constitute the file.

* * * * *